(12) United States Patent
Li

(10) Patent No.: US 10,725,649 B2
(45) Date of Patent: Jul. 28, 2020

(54) GRAPHIC CODE DISPLAY METHOD AND APPARATUS

(71) Applicant: TENCENT TECHNOLOGY (SHENZHEN) COMPANY LIMITED, Shenzhen (CN)

(72) Inventor: Long Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 48 days.

(21) Appl. No.: 15/947,605

(22) Filed: Apr. 6, 2018

(65) Prior Publication Data

US 2018/0225023 A1    Aug. 9, 2018

Related U.S. Application Data

(63) Continuation of application No. PCT/CN2017/077052, filed on Mar. 17, 2017.

(30) Foreign Application Priority Data

Mar. 18, 2016 (CN) .......................... 2016 1 0157254

(51) Int. Cl.
*G06F 3/0488*    (2013.01)
*G06F 9/44*    (2018.01)
(Continued)

(52) U.S. Cl.
CPC .............. *G06F 3/0488* (2013.01); *G06F 8/61* (2013.01); *G06F 9/44* (2013.01); *H04L 51/18* (2013.01);
(Continued)

(58) Field of Classification Search
CPC . G06F 3/0488; G06F 8/61; G06F 9/44; H04L 51/18; H04L 51/24; G06K 19/06028
See application file for complete search history.

(56) References Cited

U.S. PATENT DOCUMENTS

| 8,775,963 B2* | 7/2014 | Mujkic | ............. H04M 1/72586 |
|---|---|---|---|
| | | | 715/772 |
| 8,930,271 B1* | 1/2015 | Ellis | ................... G06Q 30/0224 |
| | | | 705/41 |

(Continued)

FOREIGN PATENT DOCUMENTS

| CN | 103023919 | 4/2013 |
|---|---|---|
| CN | 103412707 | 11/2013 |

(Continued)

OTHER PUBLICATIONS

International Search Report dated Jun. 21, 2017 in PCT/CN2017/077052 filed Mar. 17, 2017. (With English Translation).

(Continued)

*Primary Examiner* — Peter D McLoone
(74) *Attorney, Agent, or Firm* — Oblon, McClelland, Maier & Neustadt, L.L.P.

(57) ABSTRACT

The present disclosure discloses a method and an information processing apparatus for displaying a graphic code. The method includes creating, by processing circuitry of an information processing apparatus, a customized layout in a notification bar. The method includes reading the graphic code from the predetermined application program by using the customized layout. The graphic code is obtained by the predetermined application program from a corresponding server linked to the predetermined application program. The method further includes displaying the graphic code in the customized layout.

20 Claims, 9 Drawing Sheets

(51) Int. Cl.
*G06F 8/61* (2018.01)
*H04L 12/58* (2006.01)
*G06K 19/06* (2006.01)
(52) U.S. Cl.
CPC ........ *G06K 19/06028* (2013.01); *H04L 51/24* (2013.01)

(56) References Cited

U.S. PATENT DOCUMENTS

| | | | | |
|---|---|---|---|---|
| 9,066,326 | B2* | 6/2015 | Narayan | H04W 12/06 |
| 9,400,978 | B2* | 7/2016 | Laracey | G06Q 20/108 |
| 10,187,872 | B2* | 1/2019 | Cho | H04W 68/02 |
| 10,380,583 | B1* | 8/2019 | Ellis | G06Q 20/322 |
| 2010/0211872 | A1* | 8/2010 | Rolston | G06F 3/0482 |
| | | | | 715/702 |
| 2011/0246284 | A1* | 10/2011 | Chaikin | G06Q 20/105 |
| | | | | 705/14.38 |
| 2011/0260964 | A1* | 10/2011 | Mujkic | G06F 3/04886 |
| | | | | 345/156 |
| 2013/0043302 | A1* | 2/2013 | Powlen | G06F 16/381 |
| | | | | 235/375 |
| 2013/0238455 | A1* | 9/2013 | Laracey | G06Q 20/108 |
| | | | | 705/21 |
| 2014/0006182 | A1* | 1/2014 | Wilson | G06Q 50/12 |
| | | | | 705/15 |
| 2014/0273820 | A1* | 9/2014 | Narayan | H04W 12/06 |
| | | | | 455/41.1 |
| 2015/0009152 | A1* | 1/2015 | Tang | G09G 5/12 |
| | | | | 345/173 |
| 2015/0213443 | A1* | 7/2015 | Geffon | G06Q 20/3821 |
| | | | | 705/76 |
| 2016/0062732 | A1 | 3/2016 | Jaygar et al. | |
| 2017/0032370 | A1* | 2/2017 | Beltramino | G06Q 20/3274 |
| 2017/0243242 | A1* | 8/2017 | Chaikin | G06Q 20/105 |
| 2017/0337045 | A1* | 11/2017 | Hills | H04L 51/046 |
| 2019/0066089 | A1* | 2/2019 | Miryala | G06Q 20/3674 |
| 2020/0028753 | A1* | 1/2020 | Powar | G06Q 20/32 |
| 2020/0042158 | A1* | 2/2020 | Skarda | G06F 3/0482 |

FOREIGN PATENT DOCUMENTS

| | | |
|---|---|---|
| CN | 104679525 | 6/2015 |
| CN | 104866523 | 8/2015 |
| CN | 104915091 | 9/2015 |
| CN | 105094777 | 11/2015 |
| CN | 105824641 | 8/2016 |

OTHER PUBLICATIONS

International Preliminary Report on Patentability dated Sep. 18, 2018, in International Application No. PCT/CN2017/077052.
Written Opinion of the International Searching Authority dated Jun. 21, 2017, in International Application No. PCT/CN2017/077052.
Office Action dated Mar. 18, 2016, in Chinese Patent Application No. 2016-101572543.
Office Action dated Jan. 2, 2019, in Chinese Patent Application No. 2016-101572543.
Office Action dated Jul. 9, 2019 in Japanese Patent Application No. 2018-536152, with English translation.
"Largely Remodel Notification Bar and Notification Panel", Don't Use Android with Default Settings, Special Topic 1, Chapter 3, Nikkei BP PC Best Mook, 2016 Latest Version, Nikkei Business Publications, Inc., Feb. 27, 2016, pp. 12-13.
Korean Office Action dated Apr. 28, 2020 in Korean Application No. 10-2018-7020334. (6 pages).

* cited by examiner (1) (2)

GRAPHIC CODE DISPLAY METHOD AND APPARATUS

RELATED APPLICATION

This application is a continuation of International Application No. PCT/CN2017/077052, filed on Mar. 17, 2017, which claims priority to Chinese Patent Application No. 201610157254.3, entitled "GRAPHIC CODE DISPLAY METHOD AND APPARATUS" filed with the Chinese Patent Office on Mar. 18, 2016. The entire disclosures of the prior applications are hereby incorporated by reference in their entirety.

FIELD

The present disclosure relates to the field of communication technologies, and in particular, to a method and an apparatus for graphic code display.

BACKGROUND

A graphic code is a graphic pattern where geometric features are distributed/arranged on a plane according to a rule. The graphic code has a function of recording information.

The function of recording information provides the graphic code many applications, such as information pushing (e.g., a merchant can use an electronic device to present a graphic code to a customer for scanning, and the customer can directly browse information pushed by the merchant), friend adding (e.g., a user can use an electronic device to present a graphic code to another user for scanning, and the another user can add the user as a friend), and resource transfer (e.g., a user uses an electronic device to present a graphic code to a third party for scanning, and the electronic device and an electronic device used by the third party can complete a resource transfer through an electronic device channel provided by a predetermined server).

SUMMARY

In related arts, a procedure to present a graphic code is complex. Embodiments of the present disclosure provide a method and an apparatus to display the graphic code that addresses the problem associated with this complex procedure.

In an embodiment of the present disclosure, there is provided a method for displaying a graphic code. The method includes creating a customized layout in a notification bar by processing circuitry of an information processing apparatus. The method includes reading a graphic code from a predetermined application program by using the customized layout while the graphic code is obtained by the predetermined application program from a corresponding server linked thereto. The method further includes displaying the graphic code in the customized layout.

In an embodiment of the present disclosure, there is provided an information process apparatus. The apparatus includes processing circuitry configured to create a customized layout in a notification bar. The processing circuitry is configured to read a graphic code from a predetermined application program by using the customized layout while the graphic code is obtained by the predetermined application program from a corresponding server linked thereto. The processing circuitry is further configured to display the graphic code in the customized layout.

In an embodiment of the present disclosure, there is provided a non-transitory computer-readable storage medium. The non-transitory computer-readable storage medium has computer readable instructions stored. When executed by a processor, the instructions saved in the computer-readable storage medium cause the processor to perform operations of displaying a graphic code. The operations include creating a customized layout in a notification bar. The operations include reading a graphic code from a predetermined application program by using the customized layout while the graphic code is obtained by the predetermined application program from a corresponding server linked thereto. The operations further include displaying the graphic code in the customized layout.

As mentioned above, in related examples, a procedure to present a graphic code is complex. In the present disclosure, a novel method is provided. In the disclosed method, a customized layout can be created in a notification bar. A graphic code can be obtained and read from a predetermined application program through the customized layout and displayed in the customized layout. In the present disclosure, a graphic code associated with an application program can be directly displayed in a notification bar through the method disclosed above. Comparing to the related examples, the disclosed method saves tedious steps to show a graphic code and reduces a display process of the graphic code. As mentioned above, a graphic code is associated with one or more operations, such as information pushing, friend adding, and resource transfer, for example. Therefore, the disclosed method makes operations associated with the graphic code convenient.

BRIEF DESCRIPTION OF THE DRAWINGS

To describe the technical solutions of the embodiments of the present disclosure more clearly, the accompanying drawings for illustrating the embodiments will be introduced briefly in the following discussion. The drawings in the following description only illustrate some embodiments of the present disclosure, and a person of ordinary skill in the art may derive other drawings based on these accompanying drawings.

DESCRIPTION OF EMBODIMENTS

To make the objectives, technical solutions, and advantages of the present disclosure clearer, the following detailed description should be read with reference to the drawings, in which identical reference numbers refer to like elements throughout the different figures.

In an embodiment of the present disclosure, before using an electronic device to present a graphic code, a user needs to open a predetermined interface in a predetermined application program on the electronic device first, and then displays the graphic code in the predetermined interface. Such a graphic code display method is complex.

Figure 1:
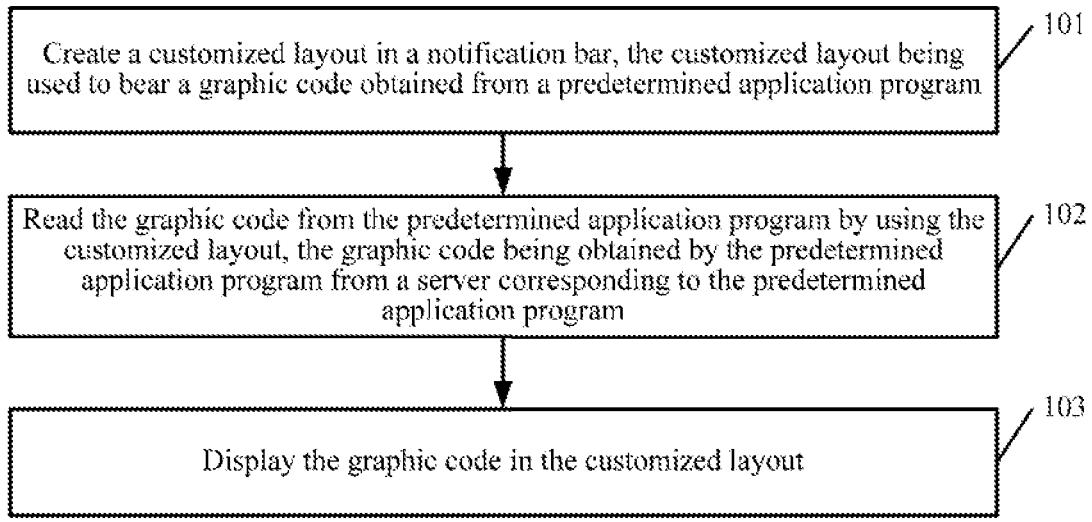
FIG. 1 is a flowchart of a graphic code display method according to an embodiment of the present disclosure.

FIG. 1 is a flowchart of a graphic code display method according to an embodiment of the present disclosure. An example in which the graphic code display method is applied to an electronic device is used for description. The electronic device described here may be a device such as a smartphone and a tablet computer. As shown in FIG. 1, the graphic code display method includes the following steps:

In step 101: A customized layout in a notification bar is created, and the customized layout is used to bear (or display) a graphic code obtained from a predetermined application program.

A convenient notification bar (referred to as a notification bar for short below) is system security type software. When the electronic device is powered on and runs, the notification bar is loaded and run. The notification bar keeps running in the background and is hidden from display. The electronic device displays the notification bar when receiving a display request, for example, a pull-down operation performed by a user on a display screen of the electronic device.

The notification bar is an area that is set by a system at an end of a display screen of an electronic device and is used to present an unread message and other common program icons. Unread messages that are of other application programs and are intercepted from system files may be displayed on the notification bar. An icon indicating the remaining power of the electronic device, an icon indicating a current network access mode of the electronic device, and the like may further be displayed in the notification bar. In addition, the customized layout may further be displayed, and the obtained graphic code is displayed in the customized layout.

Generally, notification icons of the application programs to which these unread messages belong, the icon indicating the remaining power, and the icon corresponding to the network access mode are all displayed in a fixed presentation area of the notification bar. When a pull-down instruction on the notification bar is received, unread messages in the notification bar may be presented in a pull-down interface in a list form, and notification icons corresponding to the unread messages are deleted from the fixed presentation area of the notification bar. Other icons (for example, the icon indicating the remaining power, and the icon indicating the network access mode) are still presented in the fixed presentation area of the notification bar.

The customized layout is one of the layouts in a list in the pull-down interface corresponding to the notification bar. The customized layout may have a shortcut icon in the fixed presentation area of the notification bar. The shortcut icon here is equivalent to the foregoing notification icon. The customized layout is equivalent to an item that is in the pull-down interface and is used to present an unread message.

The graphic code is a graphic that carries information, and is, for example, a common barcode or two-dimensional code.

In step 102: the graphic code is read from the predetermined application program by using the customized layout. The graphic code is obtained by the predetermined application program from a corresponding server linked to the predetermined application program.

The application program may be a payment application program, a social networking application program, or the like. These application programs obtain corresponding graphic codes from servers according to corresponding operations of user accounts. Another device can scan such graphic codes to obtain information in the graphic code.

In step 103: the graphic code is displayed in the customized layout.

To sum up, in the graphic code display method provided in this embodiment of the present disclosure, a customized layout is created in a notification bar, and a graphic code obtained from a predetermined application program is displayed in the customized layout. A graphic code involved in an application program can be directly displayed in a notification bar. In addition, the operation of opening a notification bar is very simple. For example, only a swipe action on a screen is needed to open a notification bar running in the background. Therefore, complex steps of displaying a graphic code are omitted. Therefore, the problem of complex steps of displaying a graphic code in a related example is resolved. A procedure of displaying a graphic code is shortened, so that it becomes more convenient to use a graphic code to perform a corresponding operation.

Figure 2A:
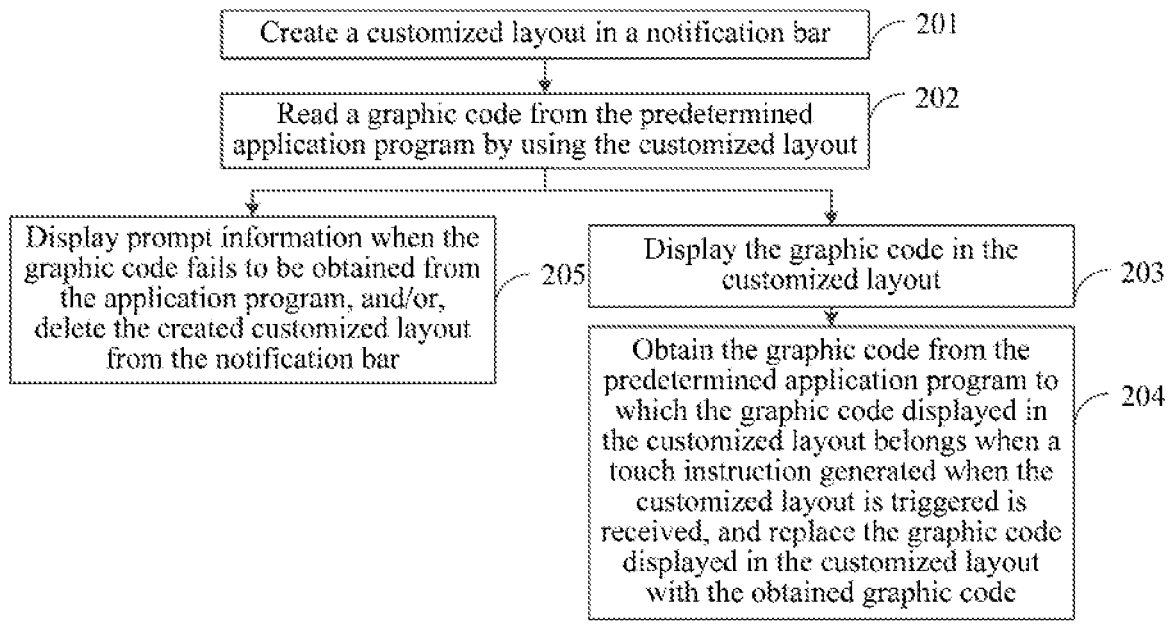
FIG. 2A is a flowchart of a graphic code display method according to another embodiment of the present disclosure.

FIG. 2A is a flowchart of a graphic code display method according to another embodiment of the present disclosure. An example in which the graphic code display method is mainly applied to an electronic device is used for description. The electronic device described here may be a device such as a smartphone and a tablet computer. As shown in FIG. 2A, the graphic code display method includes the following steps:

In step 201: a customized layout is created in a notification bar.

The customized layout is used to bear a graphic code obtained from a predetermined application program.

The graphic code may be a barcode, a two-dimensional code, or the like. The graphic code may express related information by using a presented graphic. A specific form of the graphic code is not limited in this embodiment.

In this embodiment, to create the customized layout in the notification bar, the customized layout can be established by using function of RemoteView of Notification service in an Android system.

In step 202: a graphic code is read from the predetermined application program by using the customized layout.

The predetermined application program may be an application program that involves obtaining and presentation of a graphic code, and is, for example, a payment application program, or a social networking application program. These predetermined application programs may be preset by a developer. Once finding that such predetermined application programs are installed on the electronic device, the system obtains graphic codes from these installed predetermined application programs.

The predetermined application program obtains a graphic code from a corresponding server linked to the predetermined application program. Another device can scan such a graphic code to obtain information in the graphic code.

Notification in the Android system has a global characteristic and an cross-process feature. A process disclosed herein is a running activity of a computer program on a data set. Therefore, the customized layout established by using function of RemoteView of Notification service in an Android system can read content (for example, a graphic code or other information) from other application programs.

In an embodiment of the present disclosure, when the graphic code is read from the predetermined application program by using the customized layout, a graphic code obtaining instruction or a fetching command can be sent to the predetermined application program at a predetermined moment by using the customized layout to obtain the graphic code, and the graphic code fed back by the predetermined application program can be received.

The graphic code obtaining instruction is used to trigger that the predetermined application program feeds back the obtained graphic code to the notification bar.

To prevent the graphic code from being maliciously scanned, the server corresponding to the predetermined application program periodically updates the graphic code in real time at a predetermined time interval. After the server updates the graphic code, the graphic code obtained by the electronic device before the update of the graphic code expires. To ensure that the electronic device can obtain a valid graphic code in real time, the predetermined application program periodically sends a request to the server at a predetermined time interval to obtain an updated graphic code. Therefore, after the system or the notification bar of the electronic device sends the graphic code obtaining instruction to the predetermined application program installed on the electronic device, it is triggered that the predetermined application program obtains the latest graphic code obtained at a last time before the graphic code obtaining instruction is received, or it is triggered that the predetermined application program obtains a graphic code obtained from the server after the graphic code obtaining instruction is received. The predetermined application program feeds back the obtained graphic code to the notification bar after obtaining the graphic code.

The predetermined moment is a moment corresponding to the predetermined time interval or a moment at which the predetermined application program is opened. The specific duration of the predetermined time interval may be manually set by a user or may be set by a developer in advance.

In step 203: the graphic code is displayed in the customized layout.

As can be seen from the foregoing characteristics of the customized layout, the customized layout established by using function of RemoteView in Notification service of the Android system can read content from other application programs. The content is, for example, a graphic code or other information. In this way, the content read from other application programs can be displayed on the established customized layout, so that the customized layout in the notification bar can display the content in the application programs. The content can be directly viewed in the notification bar, so that a procedure of reading the content from the application programs is simplified.

It should be noted that to successfully read the graphic code from the predetermined application program by using the customized layout, a type of content to be read from the application program may be defined when the customized layout is defined. The type is defined to be a graphic code or defined to be a barcode, a two-dimensional code, or the like. In this way, the customized layout only needs to read a defined graphic code to read content from the predetermined application program.

During actual implementation, the customized layout may display no content after being created. That is, the display content is blank. The customized layout superposes a read graphic code in a display area of the customized layout for display after successfully reading the graphic code from the predetermined application program. In a possible implementation, the graphic code may be displayed in the customized layout by using the following code:

```
public Notification getNotification(Context context, UMessage msg) {
    switch (msg.builder_id) {
    case 1:
        NotificationCompat.Builder builder = new NotificationCompat.Builder(context);
        RemoteViews myNotificationView = new RemoteViews(context.getPackageName( ), R.layout.notification_view);
        myNotificationView.setTextViewText(R.id.notification_title, msg.title);
        myNotificationView.setTextViewText(R.id.notification_text, msg.text);
        myNotificationView.setImageViewBitmap(R.id.notification_large_icon, getLargeIcon(context, msg));
        myNotificationView.setImageViewResource(R.id.notification_small_icon, getSmallIconId(context, msg));
        builder.setContent(myNotificationView);
        Notification mNotification = builder.build( );
        mNotification.contentView = myNotificationView;
        return mNotification;
    default:
        return super.getNotification(context, msg);
    }
}
```

The Extensible Markup Language (XML) is used to construct a style of a customized Notification.

In an embodiment of the present disclosure, if the size of the customized layout is set to be large to completely display the graphic code, as a result, a pull-down interface of the notification bar cannot display more notification messages. Therefore, the graphic code may be displayed in the customized layout in at least two display manners as follows:

In the first display manner, the graphic code is displayed in the customized layout in a thumbnail.

Figure 2B:
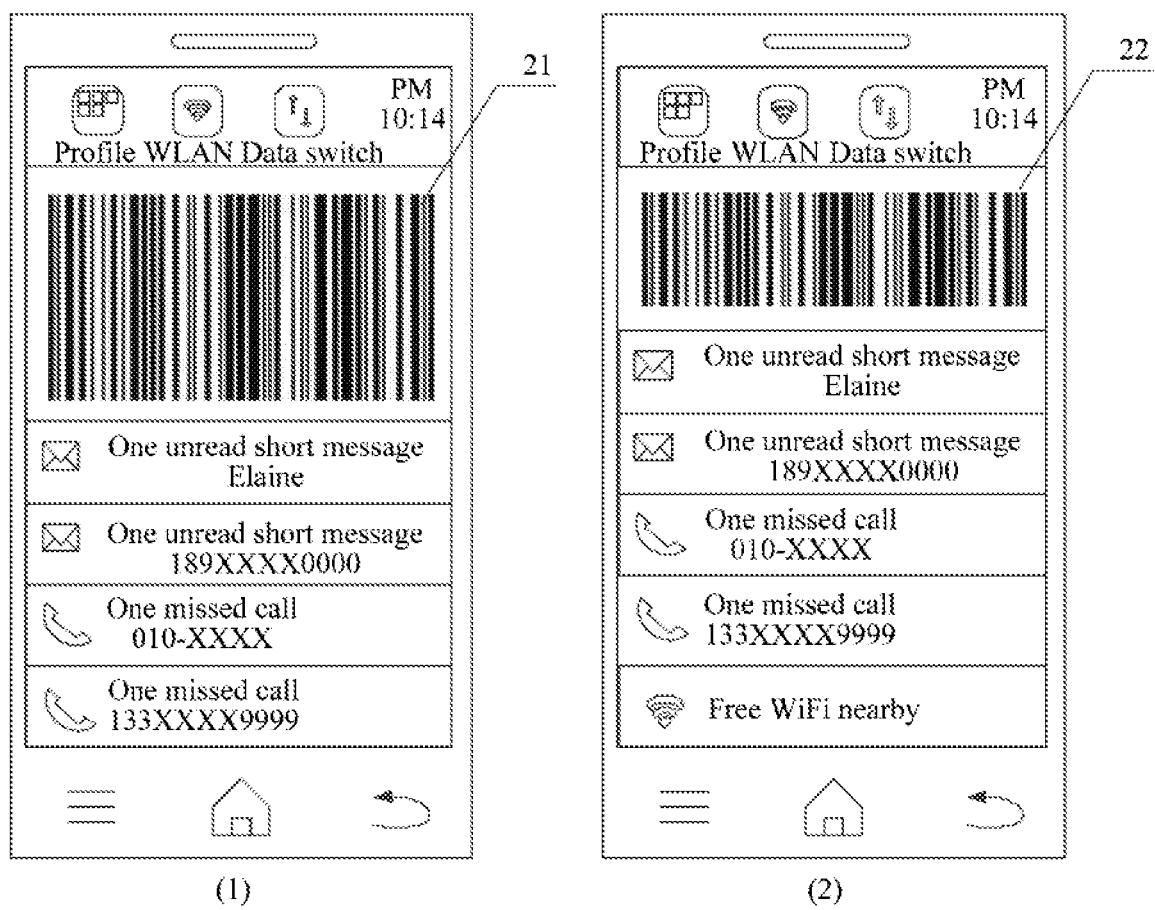
FIG. 2B is a schematic diagram of displaying a graphic code in a customized layout according to an embodiment of the present disclosure.

FIG. 2B is a schematic diagram of displaying a graphic code in a customized layout according to an embodiment of the present disclosure. As shown in FIG. 2B, the graphic code 21 in FIG. 2B (1) has an original size. In addition to the graphic code 21, four notification messages can be displayed in the pull-down interface of the notification bar. To display more notification messages in the pull-down interface of the notification bar, a graphic code 22 having a reduced size is displayed in the customized layout in FIG. 2B (2). That is, the graphic code 22 is a graphic code obtained after the size of the graphic code 21 is reduced. In this way, in addition to the graphic code 22, five notification messages can be displayed in the pull-down interface of the notification bar. Obviously, by using the display manner of displaying a graphic code in the customized layout in a thumbnail, a quantity of notification messages displayed in the pull-down interface of the notification bar can be increased.

Figure 2C:
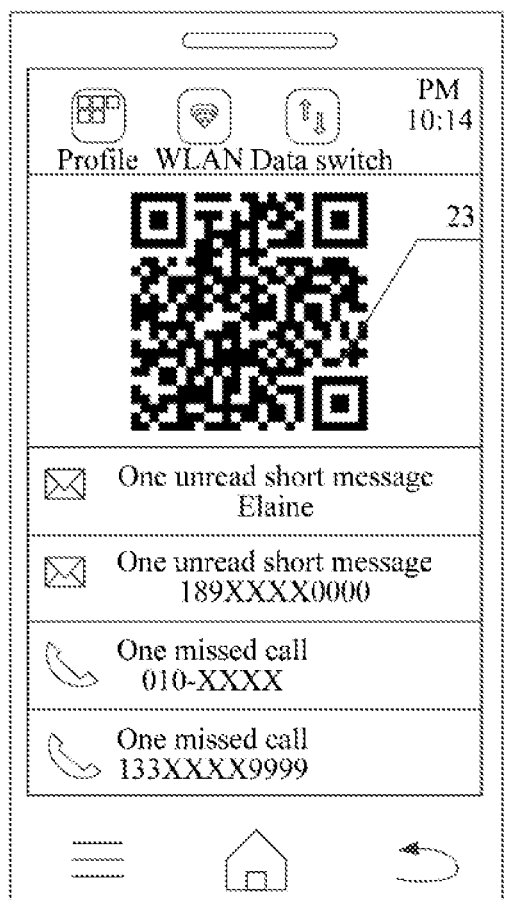
FIG. 2C is a schematic diagram of displaying a graphic code in a customized layout according to another embodiment of the present disclosure.
Figure 2C:
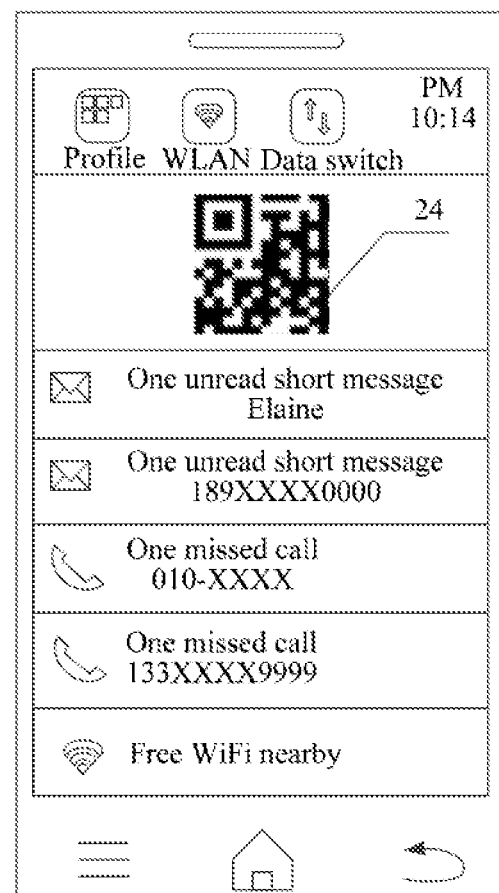

In the second display manner, the graphic code is partially displayed in the customized layout which can be demonstrated in FIG. 2C.

FIG. 2C is a schematic diagram of displaying a graphic code in a customized layout according to another embodiment of the present disclosure. As shown in FIG. 2C, a graphic code 23 in FIG. 2C (1) has an original size, in addition to the graphic code 23, four notification messages can be displayed in the pull-down interface of the notification bar. To display more notification messages in the pull-down interface of the notification bar, a graphic code 24 is partially displayed in the customized layout in FIG. 2C (2). That is, the graphic code 24 is a part of the graphic code 23. In this way, in addition to the graphic code 24, five notification messages can be displayed in the pull-down interface of the notification bar. Obviously, by using the display manner of partially displaying a graphic code in the customized layout, a quantity of notification messages displayed in the pull-down interface of the notification bar can be effectively increased.

In an embodiment of the present disclosure, to prevent a user from confusing a plurality of graphic codes and predetermined application programs corresponding to the plurality of graphic codes when the plurality of graphic codes is displayed in the notification bar, identification information of a predetermined application program to which the graphic code belongs is displayed in the customized layout when a graphic code is displayed in the customized layout.

The identification information is used to uniquely identify the predetermined application program. The identification information may be a name of the application program or a LOGO of the application program.

Figure 2D:
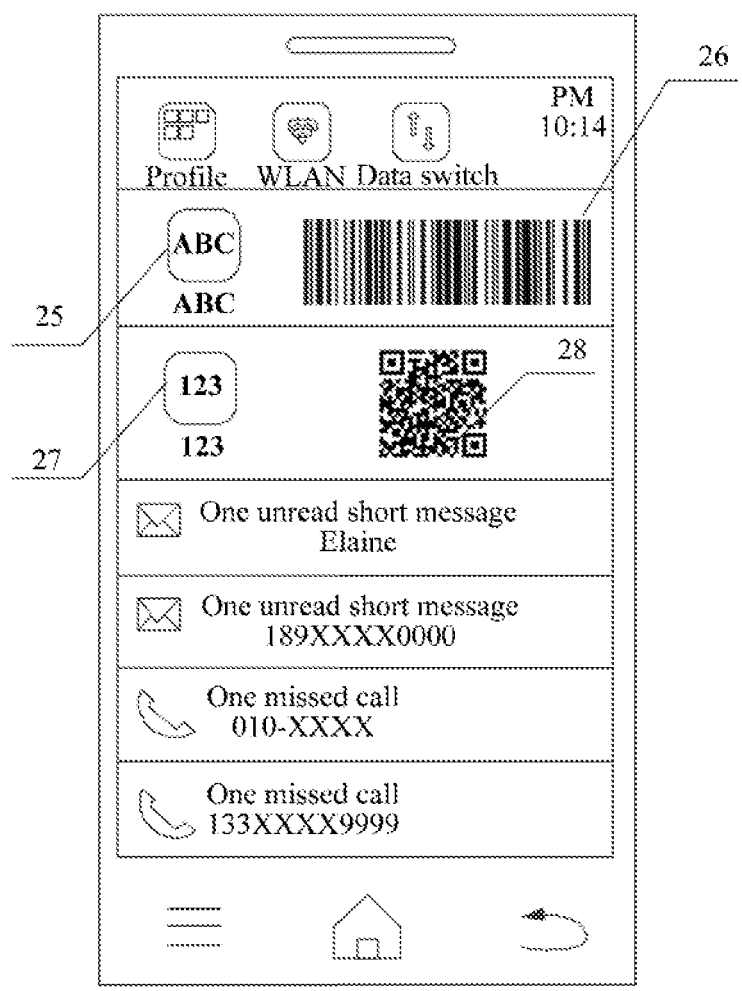
FIG. 2D is a schematic diagram of displaying identification information of a predetermined application program to which the graphic code belongs in a customized layout according to an embodiment of the present disclosure.

FIG. 2D is a schematic diagram of displaying identification information of a predetermined application program to which the graphic code belongs in a customized layout according to an embodiment of the present disclosure. As shown in FIG. 2D, identification information 25 and a graphic code 26 of a predetermined application program ABC are in a same customized layout, and identification information 27 and a graphic code 28 of a predetermined application program 123 are in a same customized layout.

Still referring to FIG. 2A where the flow chart proceeds to step 204: Obtaining a new graphic code from the predetermined application program to which the graphic code displayed in the customized layout belongs when a touch instruction generated when the customized layout is triggered is received, and replace the graphic code displayed in the customized layout with the newly obtained graphic code.

The electronic device can monitor an event by using a function of OnlineAdviceActivity in an Android system. When a user opens the notification bar and touches the customized layout, the user can trigger the predetermined application program to push a new graphic code to the customized layout of the notification bar. The new graphic code can be pushed in a format of a Bitmap file and sent to the customized layout in a way of cross-process. Once the new graphic code is received by the customized layout, the displayed graphic code is replaced with the newly received graphic code.

In an embodiment of the present disclosure, when the graphic code displayed in an original customized layout is excessively small or is not completely displayed, another device may fail to scan the graphic code. To avoid this, the graphic code displayed in the customized layout is replaced with the newly obtained graphic code by using two display manners, that is, a manner of replacement display and a manner of coverage display.

In the first display manner, the customized layout is enlarged for display. In the enlarged customized layout, the graphic code displayed in the customized layout is replaced with the newly obtained graphic code.

Figure 2E:
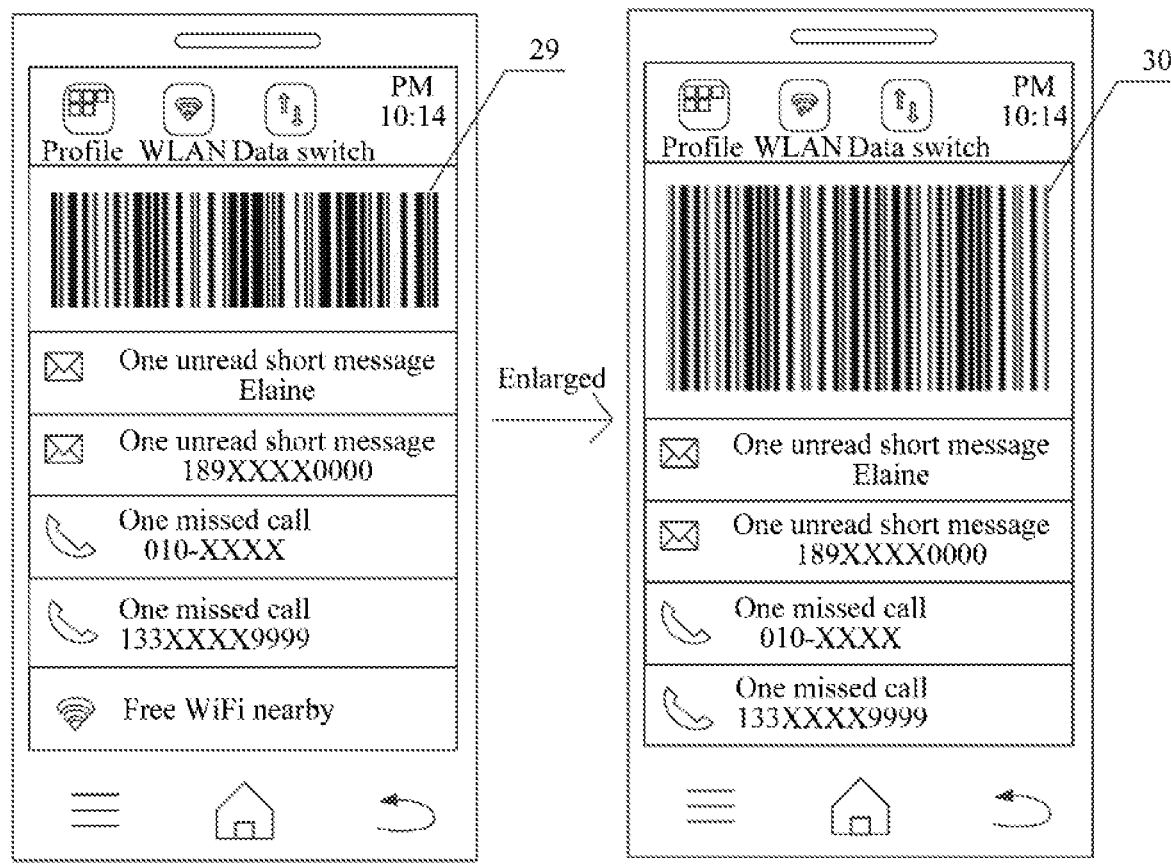
FIG. 2E is a schematic diagram of enlarging a customized layout for display according to an embodiment of the present disclosure.

FIG. 2E is a schematic diagram of enlarging a customized layout for display according to an embodiment of the present disclosure. As shown in FIG. 2E, when the electronic device receives a touch instruction generated when the customized layout is triggered, the electronic device enlarges the customized layout, obtains a new graphic code 30 from a predetermined application program to which a graphic code 29 displayed in the customized layout belongs, and replaces the graphic code 29 displayed in the enlarged customized layout with the newly obtained graphic code 30.

In the second display manner, the graphic code displayed in the customized layout is replaced with the newly obtained graphic code, and the newly obtained graphic code is completely displayed in a pop-up box covering the customized layout.

Figure 2F:
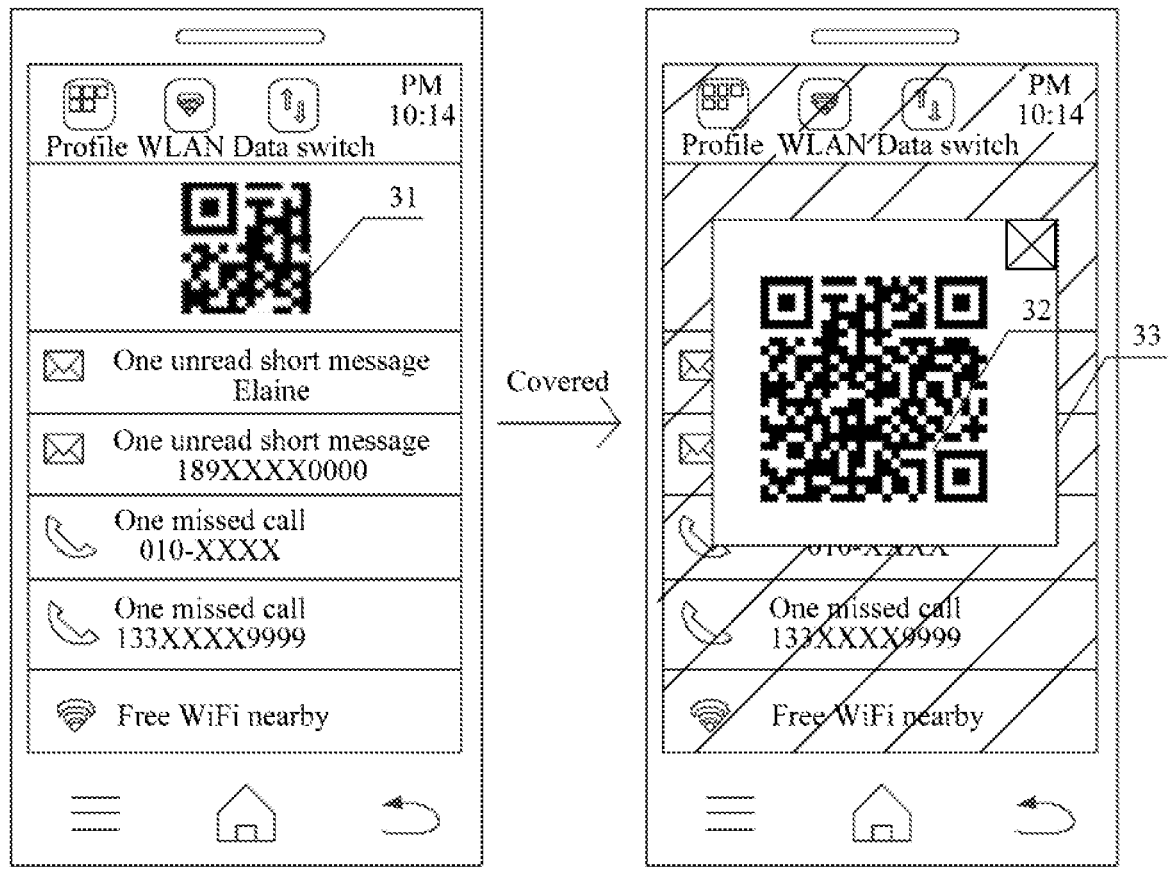
FIG. 2F is a schematic diagram of covering a customized layout for display according to an embodiment of the present disclosure.

FIG. 2F is a schematic diagram of covering a customized layout for display according to an embodiment of the present disclosure. As shown in FIG. 2F, when the electronic device receives a touch instruction generated when the customized layout is triggered, the electronic device obtains a new graphic code 32 from a predetermined application program to which a graphic code 31 displayed in the customized layout belongs, replaces the graphic code 31 displayed in the customized layout with the newly obtained graphic code 32, and completely displays the newly obtained graphic code 32 by using a pop-up box 33 covering the customized layout. The enlarged graphic code 32 or the pop-up box 33 used to bear the graphic code 32 usually covers all or some notification messages displayed in the notification bar, as shown in FIG. 2F.

To sum up, in the graphic code display method according to this embodiment of the present disclosure, a customized layout is created in a notification bar, and a graphic code obtained from a predetermined application program is displayed in the customized layout. A graphic code involved in an application program can be directly displayed in a notification bar. Complex steps of displaying a graphic code are omitted. Therefore, the problem of complex steps of displaying a graphic code is resolved. A procedure of displaying a graphic code is shortened, so that it becomes more convenient to use a graphic code to perform a corresponding operation.

In this embodiment, the graphic code is obtained periodically at a predetermined time interval, so that a graphic code displayed in the customized layout is a valid graphic code. The graphic code is obtained when the predetermined application program is opened. In this way, the processing load of the electronic device can be prevented from being increased because graphic codes are frequently obtained in real time.

In this embodiment, the graphic code is displayed in a thumbnail or partially displayed, so as to avoid that when the size of the customized layout is set to be large to completely display the graphic code, more notification messages cannot be displayed in a pull-down interface of the notification bar.

In this embodiment, the customized layout is manually touched during use to update the graphic code displayed in the customized layout, to ensure that the graphic code to be used is a valid graphic code.

In this embodiment, a manner of enlarging a customized layout for display or a manner of pop-up box display is used to enlarge the graphic code to be used, to avoid that when the graphic code displayed in the original customized layout is excessively small or is not completely displayed, another electronic device fails to scan the graphic code.

In this embodiment, identification information of a predetermined application program corresponding to a graphic code is displayed at the same time when the graphic code is displayed in the customized layout, to avoid that when graphic codes involved in a plurality of application programs are displayed in the notification bar, a user confuses the graphic codes and the predetermined application programs corresponding to the graphic codes.

In this embodiment, the customized layout is established by using function of RemoteView of Notification service in the Android system. Notification service in the Android system has a global characteristic and a cross-process feature. Therefore, the customized layout established by using the function of RemoteView of Notification service can read content (for example, a graphic code or other information) from other application programs. In this way, the read content can be displayed in the established customized layout, so that the customized layout in the notification bar can display the content in the application programs. The content can be directly viewed in the notification bar, so that a procedure of reading the content from the application programs is simplified.

In this embodiment, a type of information to be read by the customized layout from the predetermined application program is set during the establishment of the customized layout, where the type is a graphic code. The graphic code is a barcode or a two-dimensional code. The type of information that can be read by the customized layout from the predetermined application program is limited to be a graphic code. Therefore, the customized layout only needs to read a graphic code of the predetermined application program, so that a procedure of displaying a graphic code is simplified.

In a possible implementation, the customized layout can be used to display a graphic code when the electronic device successfully obtains the graphic code from the predetermined application program. The operation in step 205 in FIG. 2A may be performed when the electronic device fails to obtain the graphic code from the predetermined application program.

In step 205: when the graphic code fails to be obtained from the predetermined application program, the prompt information is displayed, and/or, the created customized layout is deleted from the notification bar.

Step 205 includes three possible implementations:

1. Display the prompt information when the electronic device fails to obtain the graphic code from the predetermined application program.

The prompt information described here includes a reason for failing to obtain the graphic code.

The prompt information may be displayed to prompt a reason that the electronic device fails to obtain the graphic code to a user when the electronic device fails to obtain the graphic code from the predetermined application program, so that the user adopts a corresponding solution. For example, the electronic device cannot obtain the graphic code from the predetermined application program when a login password of the predetermined application program expires. In this case, the electronic device may display the prompt information to prompt the user to enter the login password of the predetermined application program again.

2. Delete the created customized layout from the notification bar when the electronic device fails to obtain the graphic code from the predetermined application program.

The created customized layout may be deleted when the electronic device fails to obtain the graphic code from the predetermined application program, to avoid that when an invalid customized layout occupies the pull-down interface of the notification bar, more notification messages cannot be displayed in the pull-down interface of the notification bar.

3. Display the prompt information when the electronic device fails to obtain the graphic code from the predetermined application program, and delete the created customized layout from the notification bar.

In an embodiment of the present disclosure, the customized layout is deleted from the notification bar after a deletion instruction used to delete the customized layout is received.

In this embodiment, the prompt information may be displayed to prompt a reason that the electronic device fails to obtain the graphic code to a user when the electronic device fails to obtain the graphic code from the predetermined application program, so that the user adopts a corresponding solution, and the created customized layout may also be deleted, to avoid that when an invalid customized layout occupies the pull-down interface of the notification bar, more notification messages cannot be displayed in the pull-down interface of the notification bar.

In this embodiment, the user may manually delete a customized layout to screen, according to a requirement, graphic codes that need to be displayed.

Figure 2G:
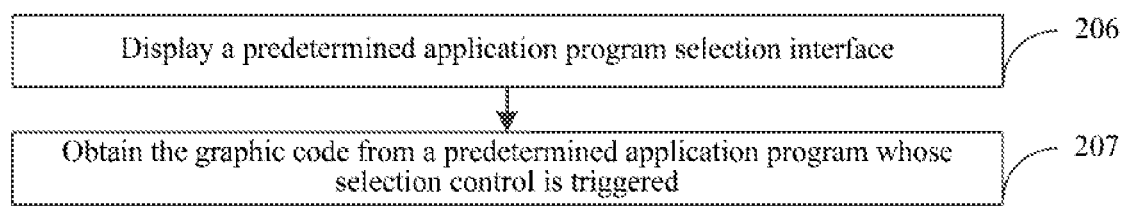
FIG. 2G is a flowchart of a method for selecting a predetermined application program in a predetermined application program selection interface according to an embodiment of the present disclosure.

In a possible implementation, the user may obtain a predetermined application program of a graphic code according to a requirement. The operation may include step 206 and step 207. Refer to FIG. 2G for details. FIG. 2G is a flowchart of a method for selecting a predetermined application program in a predetermined application program selection interface according to an embodiment of the present disclosure.

In step 206: a predetermined application program selection interface is displayed.

The predetermined application program selection interface described here includes selection controls used to select various installed predetermined application programs.

In step 207: the graphic code is obtained from a predetermined application program whose selection control is triggered.

In an embodiment of the present disclosure, redundant customized layouts are deleted when a quantity of predetermined application programs whose selection controls are triggered is less than a quantity of created customized layouts.

In an embodiment of the present disclosure, the prompt information is displayed when a quantity of predetermined application programs whose selection controls are triggered is greater than a quantity of created customized layouts. The prompt information is used to prompt a user to reduce a quantity of selected predetermined application programs.

In this embodiment, a selection interface of a predetermined application program is set, so that the user can change, in real time according to a requirement, a graphic code that is of a selected predetermined application program and is displayed in the customized layout.

Apparatus embodiments of the present disclosure are described below. For details that are not adequately described in the apparatus embodiments, refer to the foregoing corresponding method embodiments.

Figure 3A:
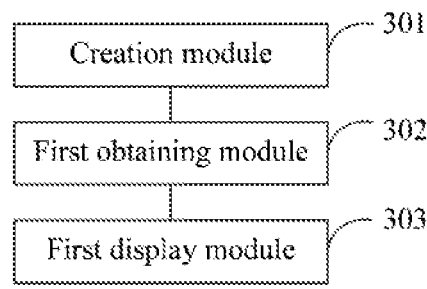
FIG. 3A is a structural block diagram of a graphic code display apparatus (or an information process apparatus) according to an embodiment of the present disclosure.

FIG. 3A is a structural block diagram of a graphic code display apparatus (or an information process apparatus) according to an embodiment of the present disclosure. An example in which the graphic code display apparatus is mainly applied to an electronic device is used for description. The electronic device described here may be a device such as a smartphone and a tablet computer. As shown in FIG. 3A, the graphic code display apparatus includes a creation module 301, a first obtaining module 302, and a first display module 303. The modules disclosed herein can be implemented using processing circuitry.

The creation module 301 is configured to create a customized layout in a notification bar, the customized layout being used to display a graphic code obtained from a predetermined application program.

The first obtaining module 302 is configured to read the graphic code from the predetermined application program by using the customized layout, the graphic code being obtained by the predetermined application program from a corresponding server linked to the predetermined application program.

The first display module 303 is configured to display the graphic code in the customized layout.

In a possible implementation, the first display module 303 is further configured to establish the customized layout by using function of RemoteView of Notification service in the Android system.

In a possible implementation, the first display module 303 is further configured to set a type of information to be read by the customized layout from the predetermined application program during the establishment of the customized layout, where the type is a graphic code.

Figure 3B:
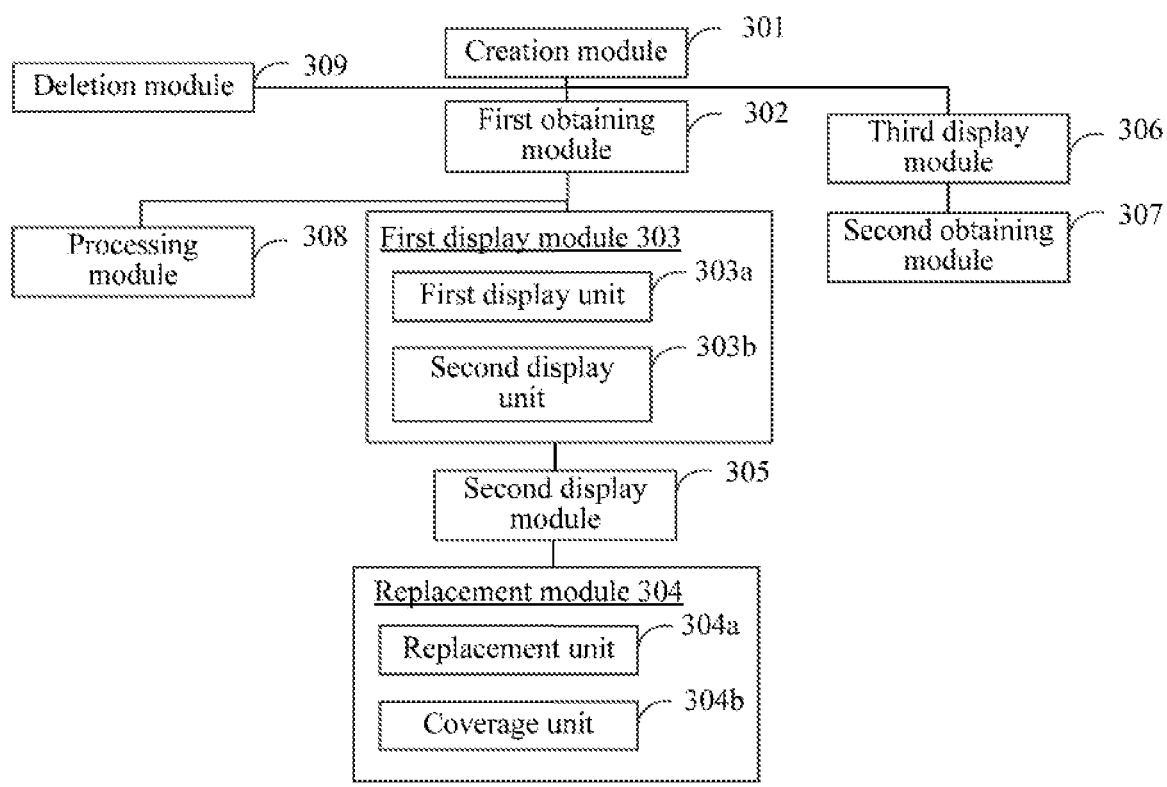
FIG. 3B is a structural block diagram of a graphic code display apparatus according to another embodiment of the present disclosure.

In a possible implementation, refer to FIG. 3B. FIG. 3B is a structural block diagram of a graphic code display apparatus according to another embodiment of the present disclosure. The first obtaining module 302 is further configured to: send a graphic code obtaining instruction to the predetermined application program at a predetermined moment by using the customized layout, where the graphic code obtaining instruction is used to trigger that the predetermined application program feeds back the obtained graphic code to the notification bar, and the obtained graphic code is a graphic code obtained by the predetermined application program before the graphic code obtaining instruction is received or is another graphic code obtained from the server after the graphic code obtaining instruction is received, and receive the graphic code fed back by the predetermined application program, where the predetermined moment is a moment corresponding to the predetermined time interval or a moment at which the predetermined application program is opened.

Still referring to FIG. 3B, the first display module 303 includes: a first display unit 303a and a second display unit 303b. The first display unit 303a or the second display unit 303b displays a graphic code when needed. The units disclosed herein can be implemented using processing circuitry.

The first display unit 303a is configured to display the graphic code in the customized layout in a thumbnail.

The second display unit 303b is configured to partially display the graphic code in the customized layout.

Still referring to FIG. 3B, the graphic code display apparatus further includes: a replacement module 304.

The replacement module 304 is configured to: obtain a new graphic code from the predetermined application program to which the graphic code displayed in the customized layout belongs when a touch instruction generated when the customized layout is triggered is received after the graphic code is displayed in the customized layout, and replace the graphic code displayed in the customized layout with the newly obtained graphic code.

Still referring to FIG. 3B, the replacement module 304 includes a replacements unit 304a and a coverage unit 304b. When the graphic code displayed in the customized layout needs to be replaced with the newly obtained graphic code, the replacements unit 304a or the coverage unit 304b performs a replacement operation.

The replacements unit 304a is configured to: enlarge the customized layout for display, and replace the graphic code displayed in the customized layout with the newly obtained graphic code in the enlarged customized layout.

The coverage unit 304b is configured to: replace the graphic code displayed in the customized layout with the newly obtained graphic code, and completely display the newly obtained graphic code in a pop-up box covering the customized layout.

Still refer to FIG. 3B, the graphic code display apparatus further includes a second display module 305.

The second display module 305 is configured to display identification information of the predetermined application program to which the graphic code belongs in the customized layout when the graphic code is displayed in the customized layout, where the identification information is used to uniquely identify the predetermined application program.

Still referring to FIG. 3B, the graphic code display apparatus further includes a third display module 306 and a second obtaining module 307.

The third display module 306 is configured to display a predetermined application program selection interface, where the predetermined application program selection interface includes selection controls used to select various installed predetermined application programs.

The second obtaining module 307 is configured to obtain the graphic code from a predetermined application program whose selection control is triggered.

Still referring to FIG. 3B, the graphic code display apparatus further includes a processing module 308.

The processing module 308 is configured to: display prompt information when the graphic code fails to be obtained from the predetermined application program, where the prompt information includes a reason for failing to obtain the graphic code, and/or, delete the created customized layout from the notification bar.

Still referring to FIG. 3B, the graphic code display apparatus further includes a deletion module 309.

The deletion module 309 is configured to delete the customized layout from the notification bar after a deletion instruction used to delete the customized layout is received.

To sum up, in the graphic code display apparatus provided in this embodiment of the present disclosure, a customized layout is created in a notification bar, and a graphic code obtained from a predetermined application program is displayed in the customized layout. A graphic code involved in an application program can be directly displayed in a notification bar. Steps of displaying a graphic code are simplified. Therefore, the problem of complex steps of displaying a graphic code is resolved. A procedure of displaying a graphic code is shortened, so that it becomes more convenient to use a graphic code to perform a corresponding operation.

In this embodiment, the customized layout is established by using function of RemoteView of Notification service in an Android system. Notification in the Android system has a global characteristic and a cross-process characteristic. Therefore, the customized layout established by using function of RemoteView of Notification service in the Android system can read content (for example, a graphic code or other information) from other application programs. In this way, the read content can be displayed in the established customized layout, so that the customized layout in the notification bar can display the content in the application programs. The content can be directly viewed in the notification bar, so that a procedure of reading the content from the application programs is simplified.

In this embodiment, a type of information to be read by the customized layout from the predetermined application program is set during the establishment of the customized layout. The type is a graphic code. The graphic code is a barcode or a two-dimensional code. The type of information that can be read by the customized layout from the predetermined application program is limited to be a graphic code. Therefore, the customized layout only needs to read a graphic code of the predetermined application program, so that a procedure of displaying a graphic code is simplified.

In this embodiment, the graphic code is obtained periodically at a predetermined time interval, so that a graphic code displayed in the customized layout is a valid graphic code. The graphic code is obtained only when the predetermined application program is opened, so that the processing load of the electronic device is prevented from being increased when the graphic code is obtained in real time.

In this embodiment, the graphic code is displayed in a thumbnail or partially displayed, so as to avoid that when the size of the customized layout is set to be large to completely display the graphic code, more notification messages cannot be displayed in a pull-down interface of the notification bar.

In this embodiment, the customized layout is manually touched during use to update the graphic code displayed in the customized layout, to ensure that the graphic code to be used is a valid graphic code.

In this embodiment, a manner of enlarging a customized layout for display or a manner of pop-up box display is used to enlarge the graphic code to be used, to avoid that when the graphic code displayed in the original customized layout is excessively small or is not completely displayed, a second electronic device fails to scan the graphic code.

In this embodiment, identification information of a predetermined application program corresponding to a graphic code is displayed at the same time when the graphic code is displayed in the customized layout, to avoid that when graphic codes involved in a plurality of application programs are displayed in the notification bar, a user confuses the graphic codes and the predetermined application programs corresponding to the graphic codes.

In this embodiment, a predetermined application program that needs to obtain a graphic code is manually selected from a selection interface displaying the predetermined application program, so that the user may change, according to a requirement, a graphic code that is of the selected predetermined application program and is displayed in the customized layout.

In this embodiment, the prompt information may be displayed to prompt a reason that the electronic device fails to obtain the graphic code to a user when the electronic device fails to obtain the graphic code from the predetermined application program, so that the user adopts a corresponding solution, and the created customized layout may also be deleted, to avoid that when an invalid customized layout occupies the pull-down interface of the notification bar, more notification messages cannot be displayed in the pull-down interface of the notification bar.

In this embodiment, a user may manually delete a customized layout to screen, according to a requirement, graphic codes that need to be displayed.

It should be noted that, when the graphic code display apparatus according to the foregoing embodiment displays a graphic code, division of the respective functional modules is only used as an example for description. In actual application, the foregoing functions may be implemented by different functional modules by means of allocation according to requirements, that is, an internal structure of the server is divided into different functional modules to implement all or some of the described-above functions. In addition, the graphic code display apparatus according to the foregoing embodiments and the embodiments of the graphic code display method belong to the same concept. For the specific implementation process, refer to the method embodiments, and the details are not described herein again.

Figure 4:
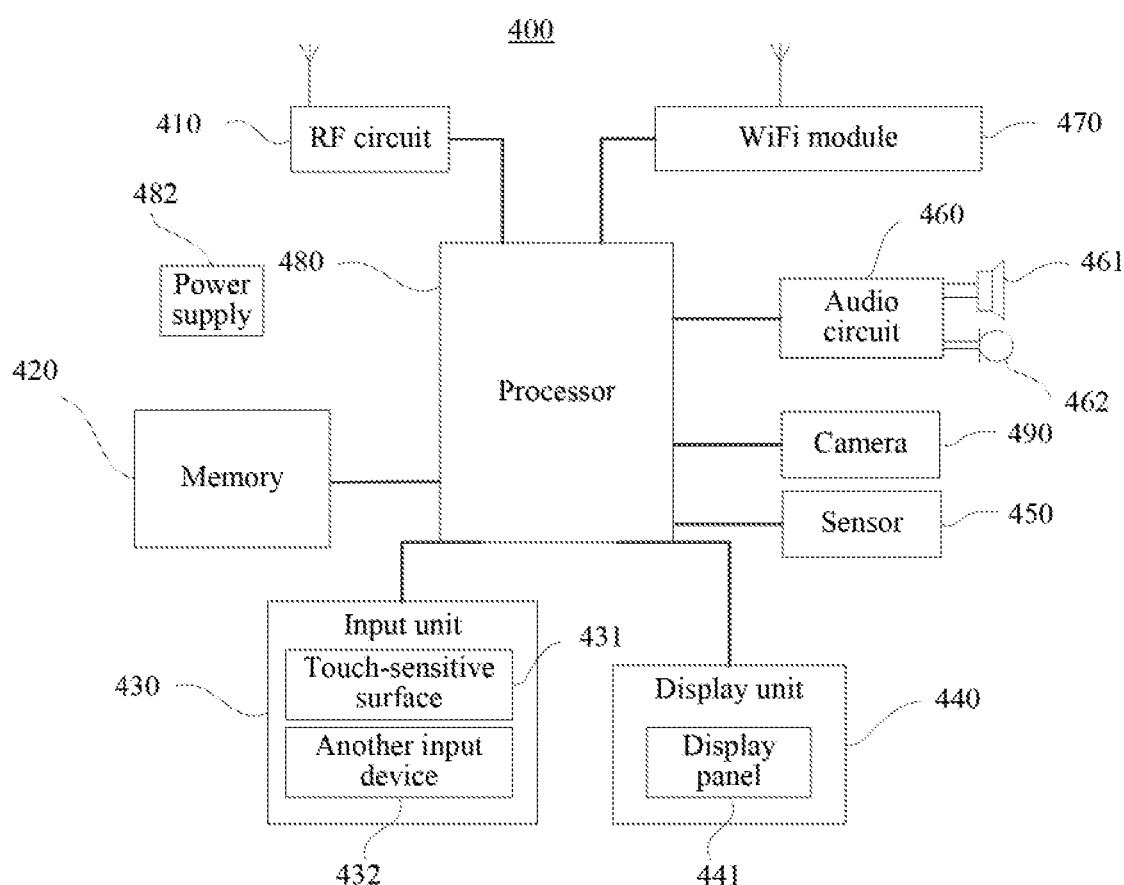
FIG. 4 is a structural block diagram of an electronic device according to an embodiment of the present disclosure.

Referring to FIG. 4, FIG. 4 is a structural block diagram of an electronic device according to some embodiments of the present disclosure. The electronic device 400 is configured to implement the graphic code display method provided in the foregoing embodiments. The electronic device 400 in the present disclosure may include one or more of the following components: a processor configured to execute a computer program instruction to complete various processes and methods, a random-access memory (RAM) and a read only memory (ROM) that are configured to store information and a program instruction, a memory configured to store data and information, an I/O device, an interface, an antenna, or the like. Specifically:

The electronic device 400 may include components such as a radio frequency (RF) circuit 410, a memory 420, an input unit 430, a display unit 440, a sensor 450, an audio circuit 460, a Wi-Fi (Wireless-Fidelity) module 470, a processor 480, a power supply 482, and a camera 490. A person skilled in the art may understand that the structure of the electronic device shown in FIG. 4 does not constitute a limitation to the electronic device, and the electronic device may include more components or fewer components than those shown in the figure, or some components may be combined, or a different component deployment may be used.

Each component part of the electronic device 400 is described below in detail with reference to FIG. 4.

The RF circuit 410 may be configured to receive and send a signal during an information receiving and sending process or a call process. Specifically, the RF circuit receives downlink information from a base station, then delivers the downlink information to the processor 480 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 410 may also communicate with a network and another device by wireless communication. The wireless communication may use any communication standard or protocol, including but not limited to Global System for Mobile communications (GSM), general packet radio service (GPRS), Code Division a plurality of Access (CDMA), Wideband Code Division a plurality of Access (WCDMA), Long Term Evolution (LTE), email, Short Messaging Service (SMS), and the like.

The memory 420 may be configured to store a software program and module. The processor 480 runs the software program and module stored in the memory 420, to implement various functional applications and data processing. The memory 420 may mainly include a program storage area and a data storage area. The program storage area may store an operating system, an application program required by at least one function (such as a sound playback function and an image display function), and the like. The data storage area may store data (such as audio data and an address book) created according to use of the electronic device 400, and the like. In addition, the memory 420 may include a high speed random-access memory, and may further include a non-volatile memory, such as at least one magnetic disk storage device, a flash memory, or other volatile solid-state storage devices.

The input unit 430 may be configured to receive input digit or character information, and generate key signal input related to the user setting and function control of the electronic device 400. Specifically, the input unit 430 may include a touch panel 431 and another input device 432. The touch panel 431 may also be referred to as a touchscreen, and may collect a touch operation of a user on or near the touch panel (such as an operation of a user on or near the touch panel 431 by using any suitable object or attachment, such as a finger or a touch pen), and drive a corresponding connection apparatus according to a preset program. In an embodiment of the present disclosure, the touch panel 431 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 480. Moreover, the touch controller can receive and execute a command sent by the processor 480. In addition, the touch-sensitive surface 431 may be implemented by using various types, such as a resistive type, a capacitive type, an infrared type, and a surface acoustic wave type. In addition to the touch panel 431, the input unit 430 may further include another input device 432. Specifically, the other input device 432 may include but is not limited to one or more of a physical keyboard, a function key (for example, a volume control key or a power on/off key), a trackball, a mouse, or a joystick.

The display unit 440 may be configured to display information input by the user or information provided for the user, and various menus of the electronic device 400. The display unit 440 may include a display panel 441. In an embodiment of the present disclosure, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, so as to determine a type of a touch event. Then, the processor 480 provides corresponding visual output on the display panel 441 according to the type of the touch event. Although, in FIG. 4, the touch panel 431 and the display panel 441 are used as two separate parts to implement input and output functions of the electronic device 400, in some embodiments, the touch panel 431 and the display panel 441 may be integrated to implement the input and output functions of the electronic device 400.

The electronic device 400 may further include at least one sensor 450, such as a gyroscope sensor, a magnetic induction sensor, an optical sensor, a motion sensor and another sensor. Specifically, the optical sensor may include an ambient light sensor and a proximity sensor. The ambient light sensor may adjust brightness of the display panel 441 according to brightness of ambient light. The proximity sensor may turn off the display panel 441 and/or backlight when the electronic device 400 is moved to an ear. As one type of motion sensor, an acceleration sensor may detect magnitude of accelerations at various directions (which generally are triaxial), may detect magnitude and a direction of the gravity when static, and may be configured to identify an application of an the electronic device gesture (such as switchover between horizontal and vertical screens, a related game, and gesture calibration of a magnetometer), a related function of vibration identification (such as a pedometer and a knock). The other sensor, such as a barometer, a hygrometer, a thermometer, and an infrared sensor, which may be configured in the electronic device 400 are not further described herein.

The audio circuit 460, a loudspeaker 461, and a microphone 462 may provide audio interfaces between the user and the electronic device 400. The audio circuit 460 may convert received audio data into an electric signal and transmit the electric signal to the speaker 461. The speaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to, for example, another terminal by using the RF circuit 410, or outputs the audio data to the memory 420 for further processing.

WiFi is a short distance wireless transmission technology. The electronic device 400 may help, by using the Wi-Fi module 470, a user to receive and send an e-mail, browse a webpage, access stream media, and the like, which provides wireless broadband Internet access for the user. Although FIG. 4 shows the Wi-Fi module 470, it may be understood that, the Wi-Fi module 470 does not belong to a necessary constitution of the electronic device 400, and can be ignored according to demands without changing the scope of the essence of the present disclosure.

The processor 480 is a control center of the electronic device 400, and connects to various parts of the entire the electronic device by using various interfaces and lines. By running or executing the software program and/or module stored in the memory 420, and invoking data stored in the memory 420, the processor 480 performs various functions and data processing of the electronic device 400, thereby performing overall monitoring on the electronic device. In an embodiment of the present disclosure, the processor 480 may include one or more processing units. The processor

480 may integrate an application processor and a modem. The application processor mainly processes an operating system, a user interface, an application program, and the like. The modem mainly processes wireless communication. It may be understood that the foregoing modem may either not be integrated into the processor 480.

The electronic device 400 further includes the power supply 482 (such as a battery) for supplying power to the components. The power supply may logically connect to the processor 482 by using a power supply management system, thereby implementing functions, such as charging, discharging, and power consumption management, by using the power supply management system.

The camera 490 is generally formed by a lens, an image sensor, an interface, a digital signal processor, a CPU, a display screen, and the like. The lens is fixed above the image sensor, and may change focusing by manually adjusting the lens. The image sensor is equivalent to a "film" of a conventional camera, and is the heart of the camera for collecting an image. The interface is configured to connect the camera to a mainboard of the electronic device by using a flat cable and a board-to-board connector and in a spring connection manner, and send the collected image to the memory 420. The digital signal processor processes the collected image by using a mathematical operation, converts a collected analog image into a digital image, and sends the digital image to the memory 420 by using the interface.

The electronic device 400 may further include a camera, a Bluetooth module, and the like, which are not further described herein. Specifically, in this embodiment, the display unit of the electronic device 400 is a touch display screen, and the electronic device 400 further includes a memory and one or more programs. The one or more programs are stored in the memory, and the one or more programs are configured to be performed by one or more processors. The one or more programs include instructions for performing the following operations:

creating a customized layout in a notification bar, the customized layout being used to bear a graphic code obtained from a predetermined application program;

reading the graphic code from the predetermined application program by using the customized layout, the graphic code being obtained by the predetermined application program from a corresponding server linked to the predetermined application program; and displaying the graphic code in the customized layout.

In an embodiment of the present disclosure, the one or more programs further include an instruction for performing the following operation:

establishing the customized layout by using function of RemoteView of Notification service in an Android system.

In an embodiment of the present disclosure, the one or more programs further include an instruction for performing the following operation:

setting a type of information to be read by the customized layout from the predetermined application program during the establishment of the customized layout, where the type is a graphic code.

In an embodiment of the present disclosure, the one or more programs further include an instruction for performing the following operation:

sending a graphic code obtaining instruction to the predetermined application program at a predetermined moment by using the customized layout, where the graphic code obtaining instruction is used to trigger that the predetermined application program feeds back the obtained graphic code to the notification bar, and the obtained graphic code is a graphic code obtained by the predetermined application program before the graphic code obtaining instruction is received or is another graphic code obtained from the server after the graphic code obtaining instruction is received, receiving the graphic code fed back by the predetermined application program, where the predetermined moment is a moment corresponding to the predetermined time interval or a moment at which the predetermined application program is opened.

In an embodiment of the present disclosure, the one or more programs further include an instruction for performing the following operation:

displaying the graphic code in the customized layout in a thumbnail;

or, partially displaying the graphic code in the customized layout.

In an embodiment of the present disclosure, the one or more programs further include an instruction for performing the following operation:

obtaining a new graphic code from the predetermined application program to which the graphic code displayed in the customized layout belongs when a touch instruction generated when the customized layout is triggered is received after the graphic code is displayed in the customized layout, and replacing the graphic code displayed in the customized layout with the newly obtained graphic code.

In an embodiment of the present disclosure, the one or more programs further include an instruction for performing the following operation:

enlarging the customized layout for display, and replacing the graphic code displayed in the customized layout with the newly obtained graphic code;

or, replacing the graphic code displayed in the customized layout with the newly obtained graphic code, and completely displaying the newly obtained graphic code in a pop-up box covering the customized layout.

In an embodiment of the present disclosure, the one or more programs further include an instruction for performing the following operation:

displaying identification information of the predetermined application program to which the graphic code belongs in the customized layout when the graphic code is displayed in the customized layout, where the identification information is used to uniquely identify the predetermined application program.

In an embodiment of the present disclosure, the one or more programs further include an instruction for performing the following operation:

displaying a predetermined application program selection interface, where the predetermined application program selection interface includes selection controls used to select various installed predetermined application programs; and obtaining the graphic code from a predetermined application program whose selection control is triggered.

In an embodiment of the present disclosure, the one or more programs further include an instruction for performing the following operation:

displaying prompt information when the graphic code fails to be obtained from the predetermined application program, where the prompt information includes a reason for failing to obtain the graphic code, and/or, deleting the created customized layout from the notification bar.

In an embodiment of the present disclosure, the one or more programs further include an instruction for performing the following operation:

deleting the customized layout from the notification bar after a deletion instruction used to delete the customized layout is received.

Figure 5:
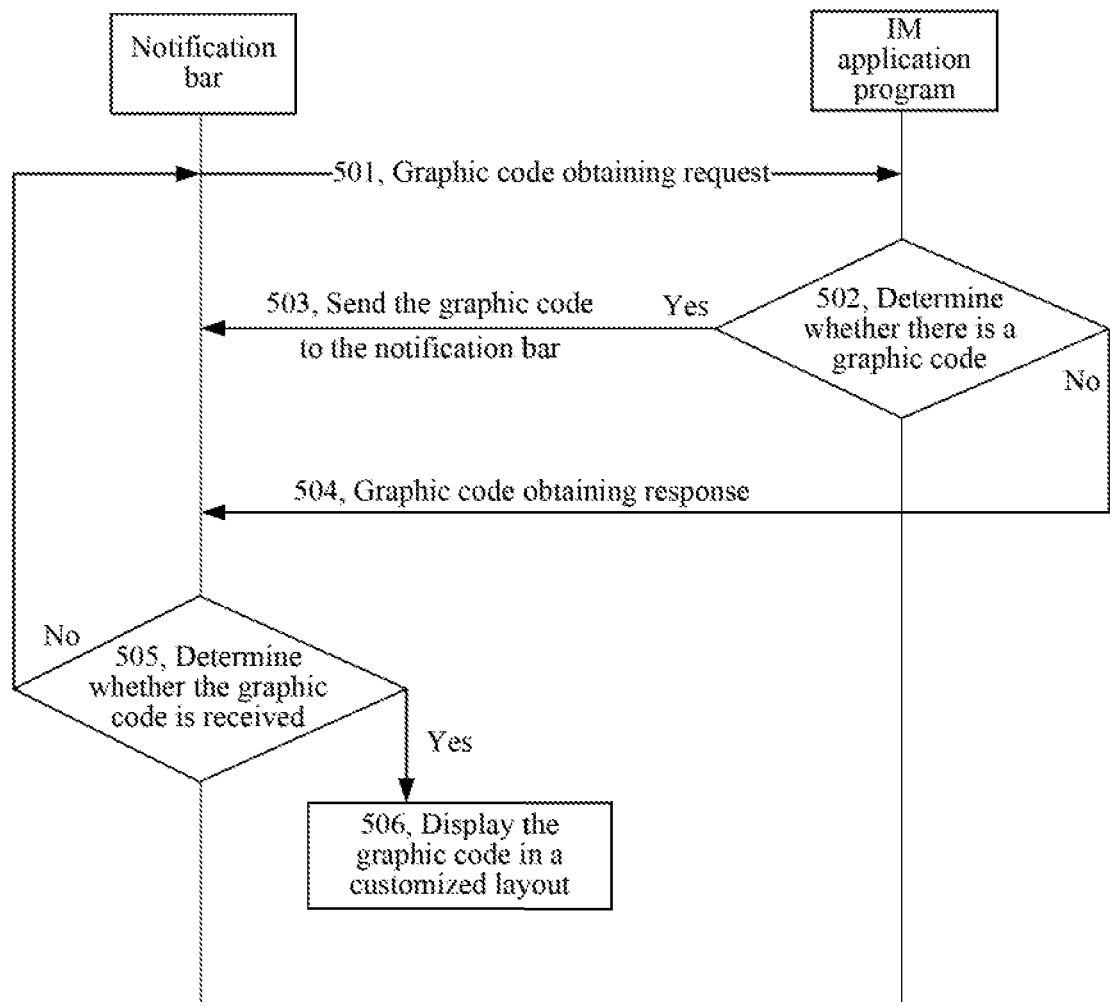
FIG. 5 is a schematic flowchart of a graphic code display method according to an embodiment of the present disclosure.

FIG. 5 is a schematic flowchart of a graphic code display method according to an embodiment of the present disclosure. In this embodiment, a process in which a notification bar application program obtains a graphic code from an instant messaging (IM) application program and displays the graphic code is shown.

An electronic device runs the notification bar and the IM application program when the electronic device is powered on and runs. In this embodiment, the electronic device may automatically load the notification bar application program, that is, the notification bar, when being powered on and running. The notification bar is hidden from display.

Step 501: The notification bar uses a created customized layout to access an IM application program, and sends a graphic code obtaining request to the IM application program.

In this embodiment of the present disclosure, the customized layout is established in advance by using function of RemoteView of Notification service. The customized layout may be used to access the IM application program across processes, and may obtain the graphic code from the IM application program.

In this embodiment, the notification bar may periodically send the graphic code obtaining request to the IM application program at an interval of a predetermined time, for example, 5 minutes.

Step 502: The IM application program determines whether the IM application program has the graphic code obtained from a server, where if yes, step 503 is performed, or otherwise, step 504 is performed.

Step 503: The IM application program sends the graphic code to the notification bar.

Step 504: The IM application program sends the graphic code obtaining response to the notification bar, where the graphic code obtaining response carries information indicating that the graphic code is not obtained.

Step 505: The notification bar determines whether the graphic code is received, where if yes, step 506 is performed, or otherwise, the process returns to step 501.

Step 506: Expand the notification bar for display, and display the graphic code in the customized layout.

The sequence numbers of the preceding embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a non-transitory computer readable storage medium. The storage medium may be a read-only memory, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for displaying a graphic code, the method comprising:
    creating, by processing circuitry of an information processing apparatus, a customized layout in a notification bar that is configured to display the customized layout with notification messages of a plurality of applications;
    reading a graphic code from a predetermined application program of the plurality of applications, in response to a request from the customized layout in the notification bar and after the graphic code is obtained by the predetermined application program from a corresponding server linked thereto; and
    displaying the graphic code in the customized layout.

2. The method of claim 1, wherein the reading the graphic code from the predetermined application program comprises:
    sending a fetching command to the predetermined application program at a predetermined moment based on the request from the customized layout in the notification bar; and
    receiving the graphic code fed back by the predetermined application program;
    wherein,
    the fetching command to obtain the graphic code is configured to trigger the predetermined application program to feed back the obtained graphic code to the notification bar,
    the obtained graphic code is either the latest graphic code obtained by the predetermined application program before receiving the fetching command or another graphic code obtained from the server after receiving the fetching command, and
    the predetermined moment corresponding to a predetermined time interval or when the predetermined application program is started.

3. The method of claim 1, wherein the displaying the graphic code in the customized layout comprises:
    displaying the graphic code in the customized layout with a thumbnail;
    or,
    partially displaying the graphic code in the customized layout.

4. The method of claim 1, further comprising:
    obtaining a new graphic code from the predetermined application program, when a touch command is received after the graphic code is displayed in the customized layout, wherein the graphic code displayed in the customized layout is obtained from the predetermined application program, and the touch command is generated when the customized layout is triggered; and
    replacing the graphic code displayed in the customized layout with the newly obtained graphic code.

5. The method of claim 4, wherein the replacing the graphic code displayed in the customized layout with the newly obtained graphic code comprises:
    enlarging the customized layout for display, and replacing the graphic code displayed in the customized layout with the newly obtained graphic code in the enlarged customized layout;
    or, replacing the graphic code displayed in the customized layout with the newly obtained graphic code, and completely displaying the newly obtained graphic code in a pop-up box which covers the customized layout.

6. The method of claim 1, further comprising:
displaying identification information of the predetermined application program to which the graphic code belongs in the customized layout when the graphic code is displayed in the customized layout, wherein the identification information uniquely identifies the predetermined application program.

7. The method of claim 1, further comprising:
displaying a selection interface for the predetermined application programs, the selection interface including selection controls used to select one or more installed predetermined application programs; and
obtaining the graphic code from the predetermined application program when the selection control of the predetermined application program is triggered.

8. The method of claim 1, further comprising:
when the graphic code fails to be obtained from the predetermined application program, displaying prompt information and/or, deleting the created customized layout from the notification bar, wherein the prompt information includes a reason for failing to obtain the graphic code.

9. The method of claim 1, further comprising:
deleting the customized layout from the notification bar after a deletion instruction used to delete the customized layout is received.

10. An information process apparatus, comprising:
processing circuitry configured to:
create a customized layout in a notification bar that is configured to display the customized layout with notification messages of a plurality of applications;
read a graphic code from a predetermined application program of the plurality of applications, in response to a request from the customized layout in the notification bar and after the graphic code is obtained by the predetermined application program from a corresponding server linked thereto; and
display the graphic code in the customized layout.

11. The information processing apparatus of claim 10, wherein
the processing circuitry is configured to send a fetching command to the predetermined application program at a predetermined moment based on the request from the customized layout in the notification bar, and receive the graphic code fed back by the predetermined application program,
the fetching command to obtain the graphic code being configured to trigger the predetermined application program to feed back the obtained graphic code to the notification bar,
the obtained graphic code being either the latest graphic code obtained by the predetermined application program before receiving the fetching command or another graphic code obtained from the server after receiving the fetching command, and
the predetermined moment corresponding to a predetermined time interval or when the predetermined application program is started.

12. The information processing apparatus of claim 10, wherein the processing circuitry is configured to
display the graphic code in the customized layout with a thumbnail; and
partially display the graphic code in the customized layout.

13. The information processing apparatus of claim 10, wherein the processing circuitry is configured to
obtain a new graphic code from the predetermined application program, when a touch instruction is received after the graphic code is displayed in the customized layout and replace the graphic code displayed in the customized layout with the new graphic code,
the graphic code displayed in the customized layout being obtained from the predetermined application program, and the touch instruction being generated when the customized layout is triggered.

14. The information processing apparatus of claim 13, wherein the processing circuitry is configured to
enlarge the customized layout for display, and replace the graphic code displayed in the customized layout with the newly obtained graphic code in the enlarged customized layout; and
replace the graphic code displayed in the customized layout with the newly obtained graphic code, and completely display the newly obtained graphic code in a pop-up box that covers the customized layout.

15. The information processing apparatus of claim 10, wherein the processing circuitry is configured to display identification information of the predetermined application program to which the graphic code belongs in the customized layout when the graphic code is displayed in the customized layout,
the graphic code being obtained from the predetermined application program and the identification information uniquely identifying the predetermined application program.

16. The information processing apparatus of claim 10, wherein the processing circuitry is configured to
display a selection interface for the predetermined application programs, the selection interface including selection controls used to select one or more installed predetermined application programs; and
obtain the graphic code from the predetermined application program when the selection control of the said predetermined application program is triggered.

17. The information processing apparatus of claim 10, wherein
the processing circuitry is configured to, when the graphic code fails to be obtained from the predetermined application program, display prompt information and/or delete the created customized layout from the notification bar,
the prompt information including a reason for failing to obtain the graphic code.

18. The information processing apparatus of claim 10, wherein the processing circuitry is configured to
delete the customized layout from the notification bar after a deletion instruction used to delete the customized layout is received.

19. A non-transitory computer-readable storage medium having computer readable instructions stored thereon which when executed by a processor cause the processor to perform operations of displaying a graphic code, the operations comprising:
creating a customized layout in a notification bar that is configured to display the customized layout and notification messages of a plurality of applications;
reading a graphic code from a predetermined application program of the plurality of applications, in response to a request from the customized layout in the notification bar and after the graphic code is obtained by the predetermined application program from a corresponding server linked thereto; and displaying the graphic code in the customized layout.

20. The medium of claim 19, wherein the operations of displaying the graphic code include:

sending a fetching command to the predetermined application program at a predetermined moment based on the request from the customized layout in the notification bar; and receiving the graphic code fed back by the predetermined application program, the fetching command to obtain the graphic code being configured to trigger the predetermined application program to feed back the obtained graphic code to the notification bar, the obtained graphic code being either the latest graphic code obtained by the predetermined application program before receiving the fetching command or another graphic code obtained from the server after receiving the fetching command, and the predetermined moment corresponding to a predetermined time interval or when the predetermined application program is started.

* * * * *